United States Patent
Jain et al.

(10) Patent No.: US 9,116,677 B2
(45) Date of Patent: Aug. 25, 2015

(54) SYSTEM AND METHOD FOR MANAGING A THERMAL POLICY OF A RECEIVING DEVICE THAT COUPLES TO A PORTABLE COMPUTING DEVICE

(71) Applicant: QUALCOMM Incorporated, San Diego, CA (US)

(72) Inventors: Ankur Jain, San Diego, CA (US); Paras S. Doshi, San Diego, CA (US); Vinay Mitter, San Diego, CA (US); Unni Vadakkanmaruveedu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 371 days.

(21) Appl. No.: 13/773,862

(22) Filed: Feb. 22, 2013

(65) Prior Publication Data
US 2014/0245029 A1    Aug. 28, 2014

(51) Int. Cl.
| | |
|---|---|
| G06F 1/16 | (2006.01) |
| G06F 1/26 | (2006.01) |
| G06F 1/20 | (2006.01) |

(52) U.S. Cl.
CPC ................ *G06F 1/26* (2013.01); *G06F 1/1632* (2013.01); *G06F 1/20* (2013.01)

(58) Field of Classification Search
CPC ................................. G06F 1/32; G06F 1/1632
USPC ............ 713/300.31, 320, 321.322, 323, 324, 713/330, 340, 375; 710/303, 304
See application file for complete search history.

(56) References Cited

U.S. PATENT DOCUMENTS

| | | | | |
|---|---|---|---|---|
| 5,721,837 | A | * | 2/1998 | Kikinis et al. ................ 710/303 |
| 5,884,049 | A | * | 3/1999 | Atkinson ...................... 710/303 |
| 2003/0154291 | A1 | | 8/2003 | Ocheltree et al. |
| 2004/0233930 | A1 | | 11/2004 | Colby, Jr. |
| 2007/0152633 | A1 | | 7/2007 | Lee |
| 2012/0005691 | A1 | | 1/2012 | Wong et al. |
| 2012/0159144 | A1 | | 6/2012 | Sengupta et al. |
| 2012/0179303 | A1 | | 7/2012 | Anderson et al. |

FOREIGN PATENT DOCUMENTS

WO       2011135352 A1    11/2011

OTHER PUBLICATIONS

International Search Report and Written Opinion—PCT/US2014/016652—ISA/EPO—Apr. 16, 2014.

\* cited by examiner

*Primary Examiner* — Jaweed A Abbaszadeh
*Assistant Examiner* — Keshab Pandey
(74) *Attorney, Agent, or Firm* — Smith Risley Tempel Santos LLC

(57) ABSTRACT

A method and system for managing a thermal policy of a receiving device that couples to a portable computing device (PCD) includes automatically detecting a presence of the PCD. After detecting the presence of the PCD, a command to deactivate a thermal sensor and to deactivate a power supply within the PCD may be issued. The thermal policy manager module of the receiving device may issue a command to adjust an operating condition of a processor within the PCD if a temperature value reaches a predetermined value. The thermal policy manager module may also adjust operation of an active cooling device if the temperature value sensed by a sensor within the PCD reaches a predetermined value. The receiving device may include at least one of a docking station, a tablet personal computer, a laptop personal computer, a desktop personal computer, a portable media player, a portable television, and a printer.

40 Claims, 7 Drawing Sheets

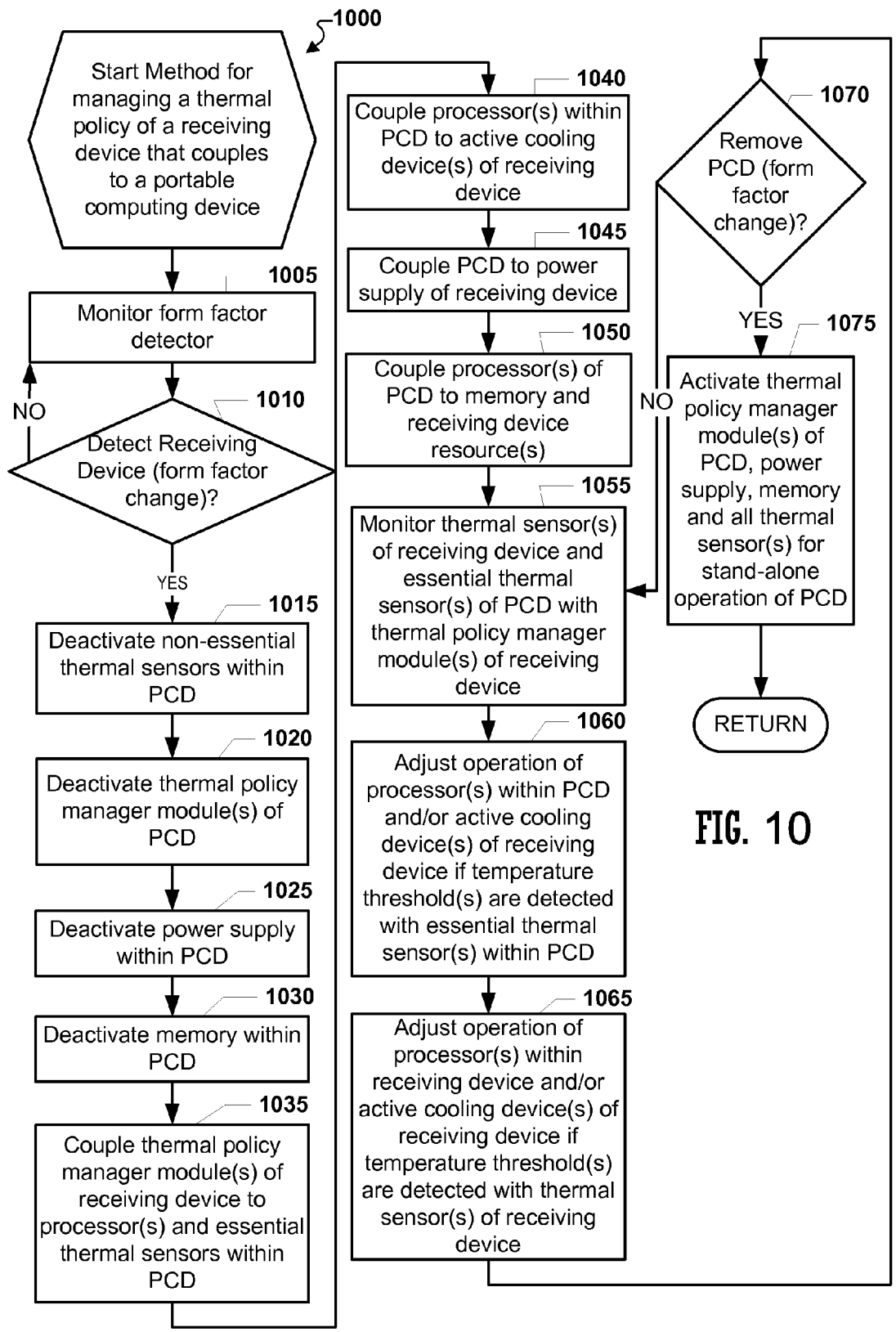

US 9,116,677 B2

SYSTEM AND METHOD FOR MANAGING A THERMAL POLICY OF A RECEIVING DEVICE THAT COUPLES TO A PORTABLE COMPUTING DEVICE

DESCRIPTION OF THE RELATED ART

Portable computing devices (PCDs) are becoming necessities for people on personal and professional levels. These devices may include cellular telephones, portable digital assistants (PDAs), portable game consoles, palmtop computers, and other portable electronic devices.

One unique aspect of PCDs is that they typically do not have active cooling devices, like fans, which are often found in larger computing devices like laptop and desk top computers. Instead of using fans, PCDs may rely on the spatial arrangement of electronic packaging so that two or more active and heat producing devices are not positioned in close proximity to one another. When two or more heat producing devices are not placed in close proximity to one another, then usually their operation does not negatively impact each other and any other electronics that may surround them. Many PCDs may also rely on passive cooling devices such as heat sinks to manage thermal energy among the electronics forming a respective PCD.

Since PCDs are compact and designed to fit in a size of an ordinary hand of a person, the thermal operating limits of PCDs are usually dictated by temperatures that are not perceived as uncomfortable to a person's hand or fingers. Such temperatures are usually referred to as "touch temperature" limits for a PCD. Meanwhile, in other operating environments, such as when a PCD is used within a larger electronic package like a tablet personal computer or a laptop portable computer, the touch temperature limits may hinder operation or lower the performance of the PCD when it is used in such a manner to provide functionality for a tablet or laptop.

SUMMARY OF THE DISCLOSURE

A method and system for managing a thermal policy of a receiving device that couples to a portable computing device (PCD) includes automatically detecting a presence of the PCD. In response to detecting the presence of the PCD, a command to deactivate a thermal sensor and a command to deactivate a power supply within the PCD may be issued. Next, an active cooling device within the receiving device may be initialized. A thermal policy manager module within the receiving device may monitor a signal comprising a temperature value which is sensed by thermal sensors within the PCD.

The thermal policy manager module of the receiving device may issue a command to adjust an operating condition of a processor within the PCD if a temperature value reaches a predetermined value. The thermal policy manager module may also adjust operation of the active cooling device if the temperature value sensed by a thermal sensor within the PCD reaches a predetermined value. A command may also be issued to deactivate a thermal policy manager module residing within the PCD when the PCD is coupled to the receiving device. A command to deactivate a memory device within the PCD may be issued while a command to initialize a memory device within the receiving device for receiving data from the PCD may also be issued. These commands may be issued by a CPU within the PCD or a thermal policy manager module within the receiving device, or both.

When the receiving device couples to the PCD, the receiving device may issue a unique identifier in response to detecting the portable computing device. The unique identifier may be communicated to the PCD across a port, such as a universal serial bus (USB) port. The receiving device may include at least one of a docking station, a tablet personal computer, a laptop personal computer, a desktop personal computer, a portable media player, a portable television, and a printer.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 10 is a logical flowchart illustrating method for managing a thermal policy of a receiving device that couples to a portable computing device.

DETAILED DESCRIPTION

Figure 1:
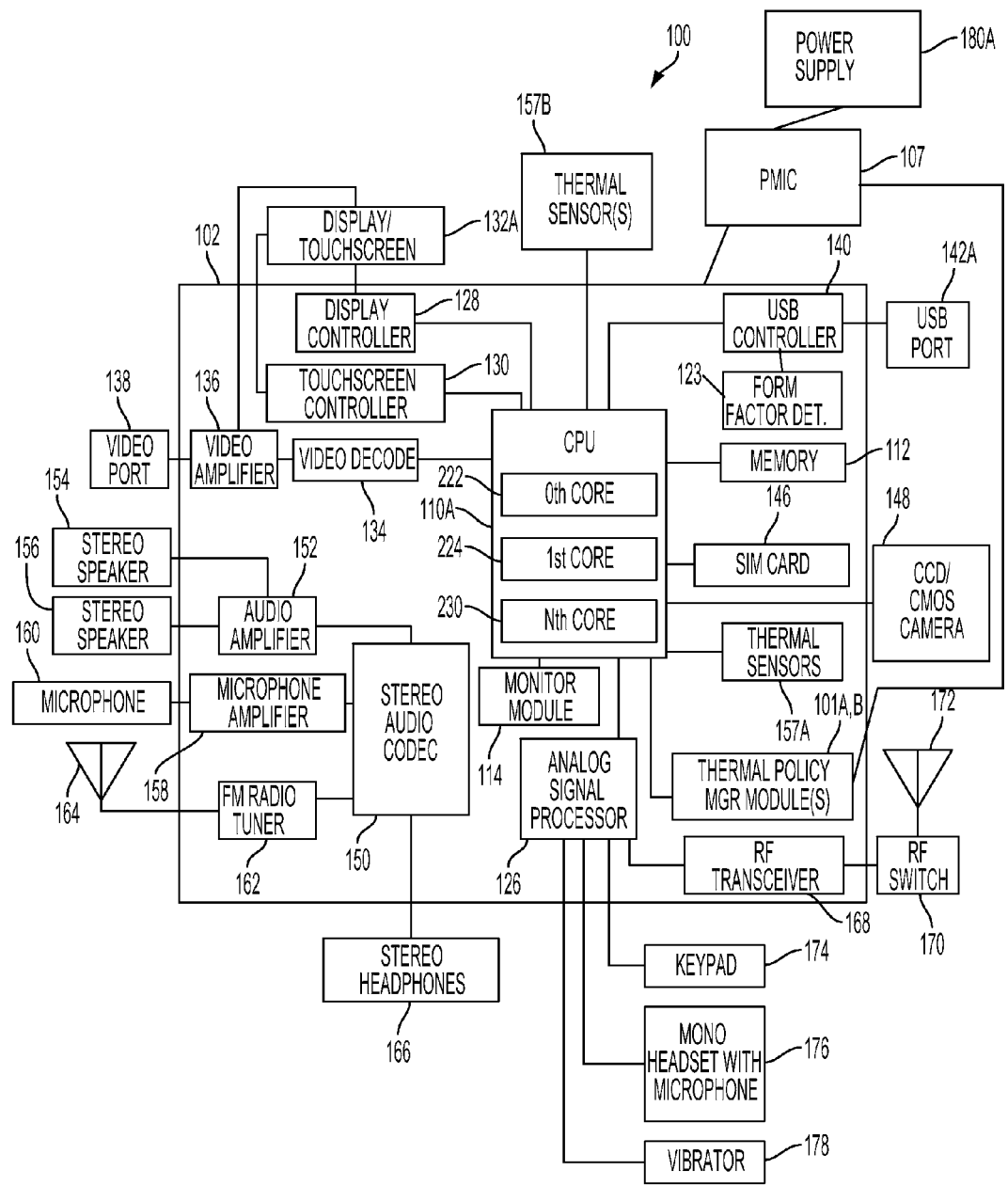
FIG. 1 is a functional block diagram illustrating an embodiment of a portable computing device (PCD)

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") wireless technology, have enabled numerous PCDs with multiple capabilities. Therefore, a PCD may be a cellular telephone, a satellite telephone, a pager, a portable digital assistant ("PDA"), a smartphone, a navigation device, a smartbook or reader, a media player, a combination of the aforementioned devices, and a laptop computer with a wireless connection, among others.

In this description, the terms "receiving device" and "larger form factor device" may be used interchangeably. A receiving device may comprise any type of hardware that is designed to receive and communicate with a PCD. Typically, the receiving device may have a hardware casing that is designed to mate and sometimes, substantially surround the hardware casing of a PCD. A receiving device may comprise anyone of a docking station, a tablet personal computer, a laptop personal computer, a desktop personal computer, a portable media player or portable television, a printer, and other similar devices.

A larger form factor device generally means a device having a hardware casing which is usually larger than the hardware casing of a portable computing device. However, in some cases or instances, the form factor device may not have a hardware casing which is larger than the hardware casing of the portable computing device. For example, a docking station may have a hardware casing which is substantially equal to and/or smaller than the hardware casing of the portable computing device. In such instances, like the docking station example, the receiving device may generally referred to as a receiving device having a different form factor relative to the hardware casing of the portable computing device.

Referring to FIG. 1, this figure is a functional block diagram of an exemplary, non-limiting aspect of a PCD 100 in the form of a wireless telephone for implementing methods and systems for managing a thermal policy of a receiving device that couples to a portable computing device. As shown, the PCD 100 includes an on-chip system 102 that includes a multi-core central processing unit ("CPU") 110A and an analog signal processor 126 that are coupled together. The CPU 110A may comprise a zeroth core 222, a first core 224, and an Nth core 230 as understood by one of ordinary skill in the art. Instead of a CPU 110A, a digital signal processor ("DSP") may also be employed as understood by one of ordinary skill in the art.

The CPU 110A may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop (and/or a current) that is converted to digital signals with an analog-to-digital converter ("ADC") controller 103 (See FIG. 2). However, other types of thermal sensors 157 may be employed without departing from the scope of this disclosure.

The thermal sensors 157, in addition to being controlled and monitored by an ADC controller 103 (See FIG. 2), may also be controlled and monitored by one or more thermal policy manager module(s) 101A,B within the PCD 100 of FIG. 1. The thermal policy manager module(s) 101A,B may comprise software which is executed by the CPU 110A. However, the thermal policy manager module(s) 101A,B may also be formed from hardware and/or firmware without departing from the scope of this disclosure.

The thermal policy manager module(s) 101A,B may be coupled to a power management integrated circuit ("PMIC") 107. The PMIC 107 may be responsible for distributing power to the various hardware components present on the chip 102. The thermal policy manager module(s) 101A,B may monitor and control aspects of the PMIC 107.

In general, the thermal policy manager module(s) 101A,B may be responsible for monitoring and controlling current flow from the PMIC 107 as well as applying thermal policies that include one or more thermal mitigation techniques. Such thermal mitigation techniques may help the PCD 100 manage thermal conditions and/or thermal loads and avoid experiencing adverse thermal conditions, such as, for example, reaching critical temperatures while maintaining a high level of functionality.

FIG. 1 also shows that the PCD 100 may include a monitor module 114. The monitor module 114 communicates with multiple operational sensors (e.g., thermal sensors 157) distributed throughout the on-chip system 102 and with the CPU 110A of the PCD 100 as well as with the thermal policy manager module(s) 101A,B. Specifically, the monitor module 114 may provide one or more indicators of events, processes, applications, resource status conditions, elapsed time, temperature, etc. in response to control signals originating from the thermal policy manager module(s) 101A,B. The thermal policy manager module(s) 101A,B may work with the monitor module 114 to identify adverse thermal conditions and apply thermal policies that include one or more thermal mitigation techniques, as will be described in further detail below.

In a particular aspect, one or more of the method steps described herein may be implemented by executable instructions and parameters, stored in the memory 112, that form the one or more thermal policy manager module(s) 101A,B. These instructions that form the thermal policy manager module(s) 101A, B may be executed by a CPU 110A, an analog signal processor 126, or any other processor, in addition to the ADC controller 103 to perform the methods described herein.

Further, all processors, 110, 126, the memory 112, the instructions stored therein, or a combination thereof residing within either a PCD 100 or a receiving device 200 as described in this disclosure may serve as a means for performing one or more of the method steps described herein. As will be described below, the thermal policy manager module(s) 101C may comprise hardware that reside on a receiving device 200 (See FIGS. 8-9) and which communicates with the CPU 110A and sensors 157 residing within the PCD 100. The thermal policy manager module(s) 101A,B residing within the PCD 100 may be deactivated or become inoperable when the PCD 100 is coupled to a receiving device 200. Meanwhile, the thermal policy manager module(s) 101C of the receiving device 200 will remain operative and control the thermal policy of the PCD 100 while it is coupled to the receiving device 200.

As illustrated in FIG. 1, a display controller 128 and a touchscreen controller 130 are coupled to the CPU 110A. A touchscreen display 132A external to the on-chip system 102 is coupled to the display controller 128 and the touchscreen controller 130.

FIG. 1 is a schematic diagram illustrating an embodiment of a portable computing device (PCD) that includes a video decoder 134. The video decoder 134 is coupled to the multi-core central processing unit ("CPU") 110A. A video amplifier 136 is coupled to the video decoder 134 and the touchscreen display 132A. A video port 138 is coupled to the video amplifier 136. As depicted in FIG. 1, a universal serial bus ("USB") controller 140 is coupled to the CPU 110A. Also, a USB port 142A is coupled to the USB controller 140.

A form factor detector 123 may be coupled to the USB controller 140. The form factor detector 123 may comprise hardware and/or software. The form factor detector may be responsible for detecting when the PCD 100 is coupled to a receiving device 200 (See FIGS. 8-9). The form factor detector 123, according to one exemplary embodiment, may sense and/or read signals received from the USB port 142 originating from the receiving device 200.

These signals may comprise an alphanumeric unique device identifier generated by the receiving device 200. If a unique identifier is sensed by the form factor detector 123, it may relay a message to the CPU 110A and/or the processor 126. In response to receiving this message, the CPU 110A and/or processor 126 of the PCD 100 may deactivate certain hardware and/or software within the PCD 100, such as the thermal policy manager module(s) 101 residing within the PCD 100 as well as certain thermal sensors 157, in addition to switching an operating system, as appropriate.

As a further response to receiving the message from the form factor detector 123, the CPU 110A and/or processor 126 may also establish communications with the thermal policy manager module(s) 101C of the receiving device 200 and relinquish control to the thermal policy manager module(s) 101 of the receiving device 200. Additional details of this switching of control for the thermal policy of the PCD 100 to the receiving device 200 as well as the deactivation of software and/or hardware within the PCD 100 will be described in further detail below.

A memory 112 and a subscriber identity module (SIM) card 146 may also be coupled to the CPU 110A. Further, as shown in FIG. 1, a digital camera 148 may be coupled to the CPU 110A. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply includes a rechargeable DC battery or a DC power supply that is derived from an alternating current ("AC") to DC transformer that is connected to an AC power source.

As depicted in FIG. 1, the touchscreen display 132A, the video port 138, the USB port 142A, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 102. The monitor module 114 may receive one or more indications or signals from one or more of these external devices by way of the analog signal processor 126 and the CPU 110A to aid in the real time management of the resources operable on the PCD 100.

Figure 2:
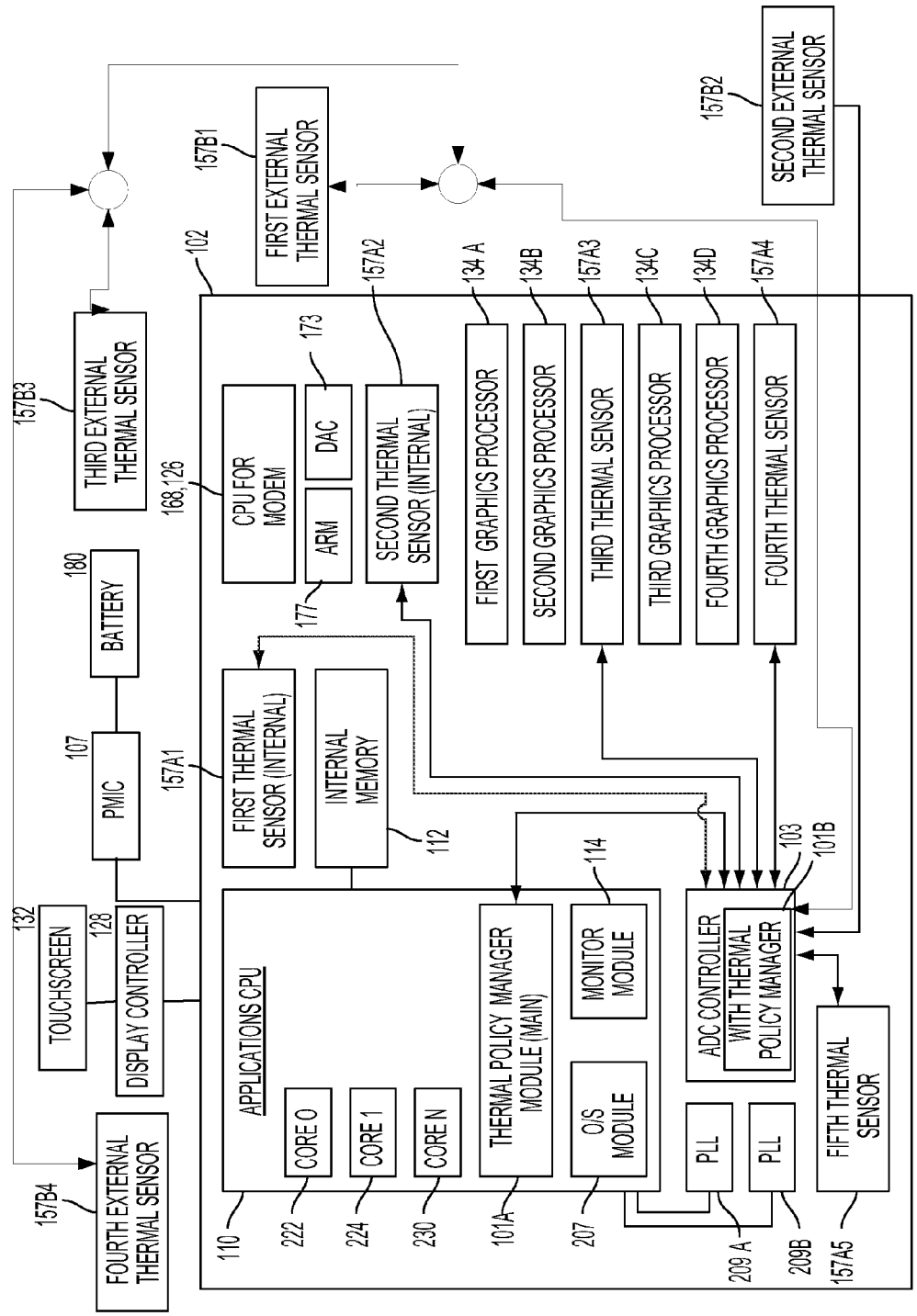
FIG. 2 is a functional block diagram illustrating an exemplary spatial arrangement of hardware for a chip illustrated in FIG. 1.

FIG. 2 is a functional block diagram illustrating an exemplary spatial arrangement of hardware for the chip 102 illustrated in FIG. 1. According to this exemplary embodiment, the applications CPU 110A is positioned on the far left side region of the chip 102 while the modem CPU 168/126 is positioned on a far right side region of the chip 102. The applications CPU 110A may comprise a multicore processor that includes a zeroth core 222, a first core 224, and an Nth core 230, as also illustrated in FIG. 1.

The applications CPU 110A may be executing a thermal policy manager module 101A (when embodied in software) or it may include a thermal policy manager module 101B (when embodied in hardware and/or firmware). The applications CPU 110A is further illustrated to include operating system ("O/S") module 207 and a monitor module 114.

The applications CPU 110A may be coupled to one or more phase locked loops ("PLLs") 209A, 209B which are positioned adjacent to the applications CPU 110A and in the left side region of the chip 102. Adjacent to the PLLs 209A, 209B and below the applications CPU 110A may comprise an analog-to-digital ("ADC") controller 103 that may include its own thermal policy manager module 101B that works in conjunction with the main thermal policy manager module(s) 101A of the applications CPU 110A.

The thermal policy manager module(s) 101B of the ADC controller 103 may be responsible for monitoring and tracking multiple thermal sensors 157 that may be provided "on-chip" 102 and "off-chip" 102. The on-chip or internal thermal sensors 157A may be positioned at various locations to monitor the thermal conditions of the PCD 100.

For example, a first internal thermal sensor 157A1 may be positioned in a top center region of the chip 102 between the applications CPU 110A and the modem CPU 168/126 and adjacent to internal memory 112. A second internal thermal sensor 157A2 may be positioned below the modem CPU 168/126 on a right side region of the chip 102. This second internal thermal sensor 157A2 may also be positioned between a an advanced reduced instruction set computer ("RISC") instruction set machine ("ARM") 177 and a first graphics processor 134A. A digital-to-analog controller ("DAC") 173 may be positioned between the second internal thermal sensor 157A2 and the modem CPU 168/126.

A third internal thermal sensor 157A3 may be positioned between a second graphics processor 134B and a third graphics processor 134C in a far right region of the chip 102. A fourth internal thermal sensor 157A4 may be positioned in a far right region of the chip 102 and beneath a fourth graphics processor 134D. And a fifth internal thermal sensor 157A5 may be positioned in a far left region of the chip 102 and adjacent to the PLLs 209 and ADC controller 103.

One or more external thermal sensors 157B may also be coupled to the ADC controller 103. The first external thermal sensor 157B1 may be positioned off-chip and adjacent to a top right quadrant of the chip 102 that may include the modem CPU 168/126, the ARM 177, and DAC 173. A second external thermal sensor 157B2 may be positioned off-chip and adjacent to a lower right quadrant of the chip 102 that may include the third and fourth graphics processors 134C, 134D.

A third external thermal sensor 157B3 may be positioned adjacent to the battery or portable power source 180 and PMIC 107 in order to sense any thermal generation of these elements. A fourth external thermal sensor 157B4 may be positioned adjacent to the touchscreen 132A and display controller 128. The fourth external thermal sensor 157B4 may be designed to sense the thermal activity of these two elements 128, 132A.

One of ordinary skill in the art will recognize that various other spatial arrangements of the hardware illustrated in FIG. 2 (or other hardware resources) may be provided without departing from the scope of this disclosure. FIG. 2 illustrates yet one exemplary spatial arrangement and how the main thermal policy manager module(s) 101A and ADC controller 103 with its thermal policy manager module(s) 101B may manage thermal states that are a function of the exemplary spatial arrangement illustrated in FIG. 2.

Thermal sensors 157 may be positioned adjacent to hardware, such the CPU 110A, and on a same surface with the hardware within the portable computing device 100. For example, see the first internal thermal sensor 157A1. The thermal policy manager module(s) 101A may assign one or more specific thermal mitigation techniques unique to the hardware associated with a particular thermal sensor 157, such as the CPU 110A corresponding to the first internal thermal sensor 157A1. In one exemplary embodiment, the thermal mitigation techniques assigned to the CPU 110A and its corresponding thermal sensor 157A1 may be different compared to the thermal mitigation techniques assigned to the third graphical processor 134C associated with the third thermal sensor 157A3. In other exemplary embodiments, the thermal mitigation techniques applied to hardware may be uniform or the same across the whole portable computing device 100.

Figure 3:
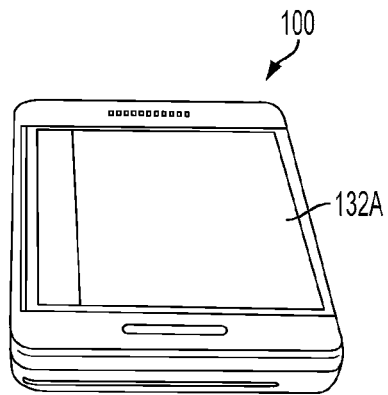
FIG. 3 is front view of an exemplary hardware casing for the portable computing device illustrated in FIGS. 1-2.

FIG. 3 is front view of an exemplary hardware casing for the portable computing device 100 illustrated in FIGS. 1-2. As illustrated in FIG. 3, the portable computing device 100 may comprise a wireless device such as a mobile telephone. The portable computing device 100 may comprise a touch-screen display 132A as understood by one of ordinary skill in the art. As noted above, this disclosure is not limited to the exemplary rectangular hardware casing illustrated. The portable computing device 100 is also not limited to only mobile telephones. The portable computing device 100 may also comprise a satellite telephone, a pager, a PDA, a smartphone, a navigation device, a smartbook or reader, a media player, a combination of the aforementioned devices, and a laptop computer with a wireless connection, among others.

Figure 4:
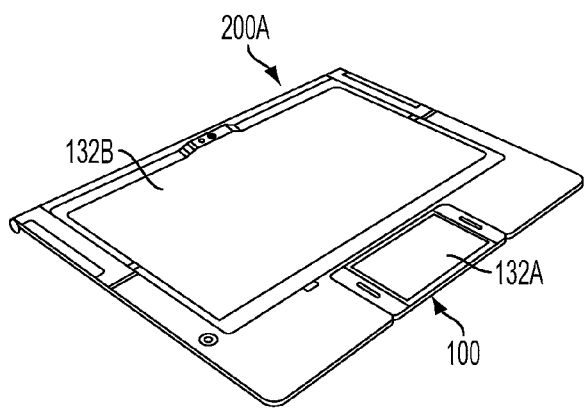
FIG. 4 is a front view of the portable computing device of FIG. 3 being contained and mounted within an exemplary receiving device comprising a tablet portable computer.

FIG. 4 is a front view of the portable computing device 100 of FIG. 3 being contained and mounted within an exemplary receiving device 200A comprising a tablet portable computer. The receiving device 200A may have its own display screen 132B relative to the display 132A of the PCD 100. The receiving device 200A may supply power to the portable computing device 100 as well as coupling the portable computing device 100 to one or more cooling devices as will be described below in FIG. 8.

As noted previously, the terms "receiving device" and "larger form factor device" may be used interchangeably in this disclosure. A receiving device 200A may comprise any type of hardware that is designed to receive and communicate with a PCD 100. Typically, the receiving device 200 may have a hardware casing that is designed to mate and sometimes, substantially surround and/or envelope the hardware casing of a PCD 100. A receiving device 200 may comprise any one of a docking station, a tablet personal computer, a laptop personal computer, a desktop personal computer, a portable media player or portable television, a printer, and other similar devices.

A larger form factor device 200 generally means a device having a hardware casing which is usually larger than the hardware casing of a portable computing device 100. However, in some cases or instances, the form factor device 200 may not have a hardware casing which is larger than the hardware casing of the portable computing device 100 as will be described below and as illustrated in FIG. 7.

Figure 5:
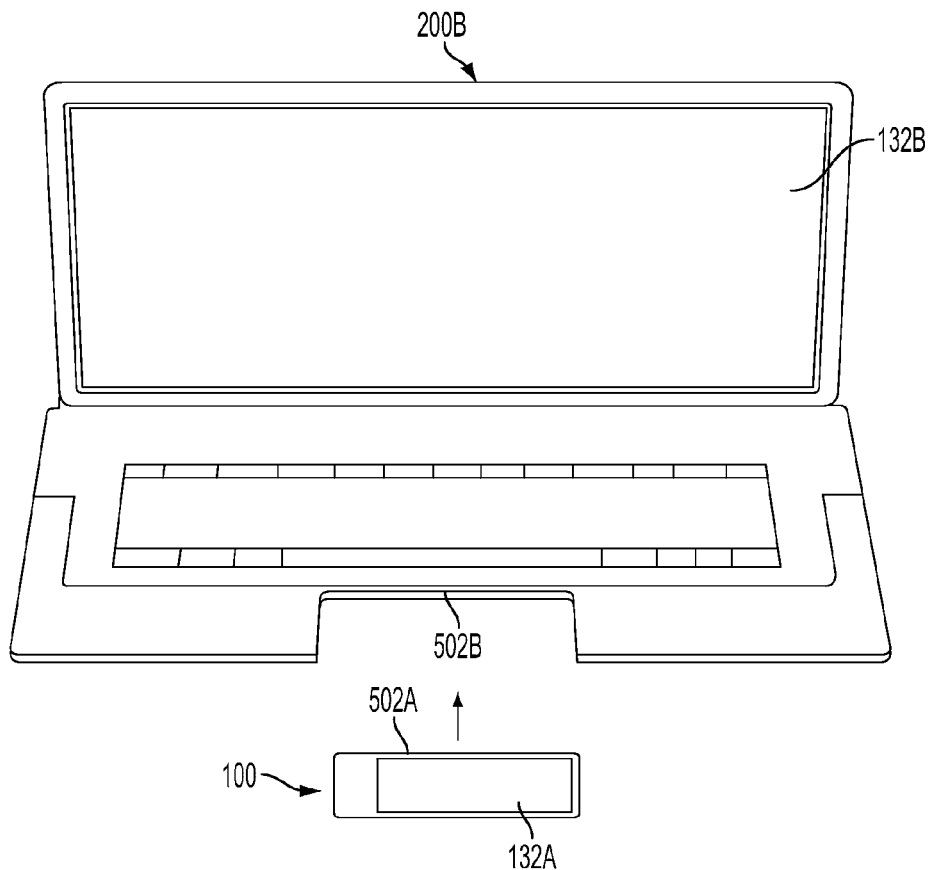
FIG. 5 is a front view of the portable computing device of FIG. 3 being contained and mounted within an exemplary receiving device comprising a laptop computer.

FIG. 5 is a front view of the portable computing device 100 of FIG. 3 being contained and mounted within an exemplary receiving device 200B comprising a laptop computer. The receiving device 200B may have a recess portion with an edge 502B that is designed to mate and couple with a leading edge 502A of the PCD 100. The edge 502B may comprise a port (not illustrated) that mates with port 142B of the PCD 100. The receiving device 200B may supply power to the portable computing device 100 as well as coupling the portable computing device 100 to one or more cooling devices as will be described below in FIG. 8.

Figure 6:
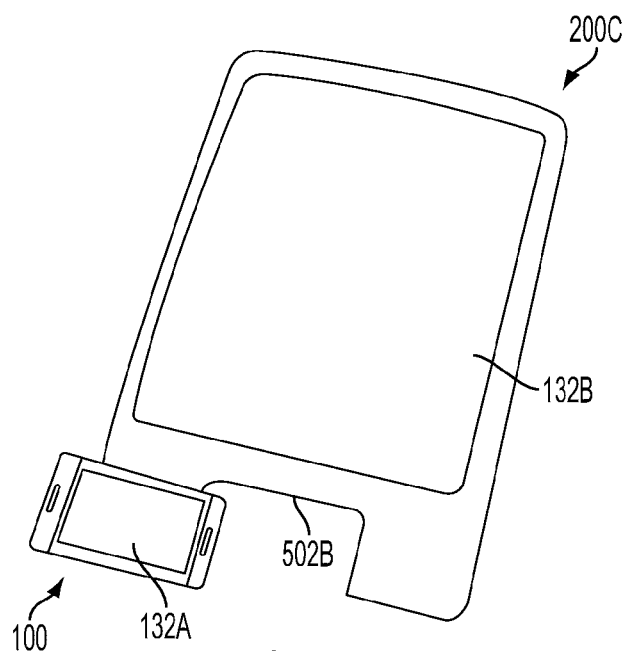
FIG. 6 is a front view of the portable computing device of FIG. 3 being contained and mounted within an exemplary receiving device comprising a portable media player.

FIG. 6 is a front view of the portable computing device 100 of FIG. 3 being contained and mounted within an exemplary receiving device 200C comprising a portable media player. This receiving device 200C may be designed to only display images and amplify audio generated by the portable computing device 100. The receiving device 200C may supply power to the portable computing device 100 as well as coupling the portable computing device 100 to one or more cooling devices as will be described below in FIG. 8.

Figure 7:
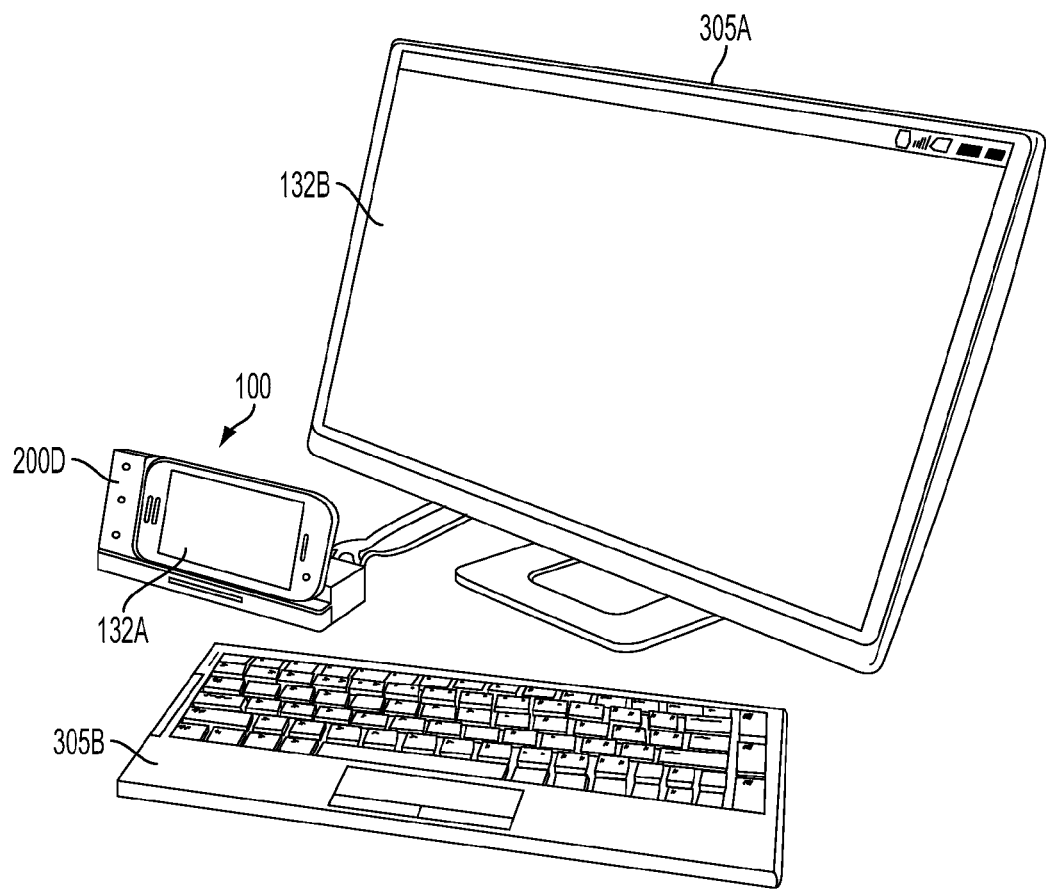
FIG. 7 is a front view of the portable computing device of FIG. 3 being contained and mounted within an exemplary receiving device comprising a docking station coupled to keyboard and full-sized display device.

FIG. 7 is a front view of the portable computing device 100 of FIG. 3 being contained and mounted within an exemplary receiving device 200D comprising a docking station coupled to keyboard 305B and full-sized display device 305A. The full-sized display device 305A may comprise a liquid crystal diode (LCD) or light emitting diode (LED) display. The portable computing device 100 may be operatively linked to the display device 305 and the keyboard 305B via the receiving device 200D comprising the docking station. The receiving device 200A may supply power to the portable computing device 100 in this exemplary embodiment.

Figure 8:
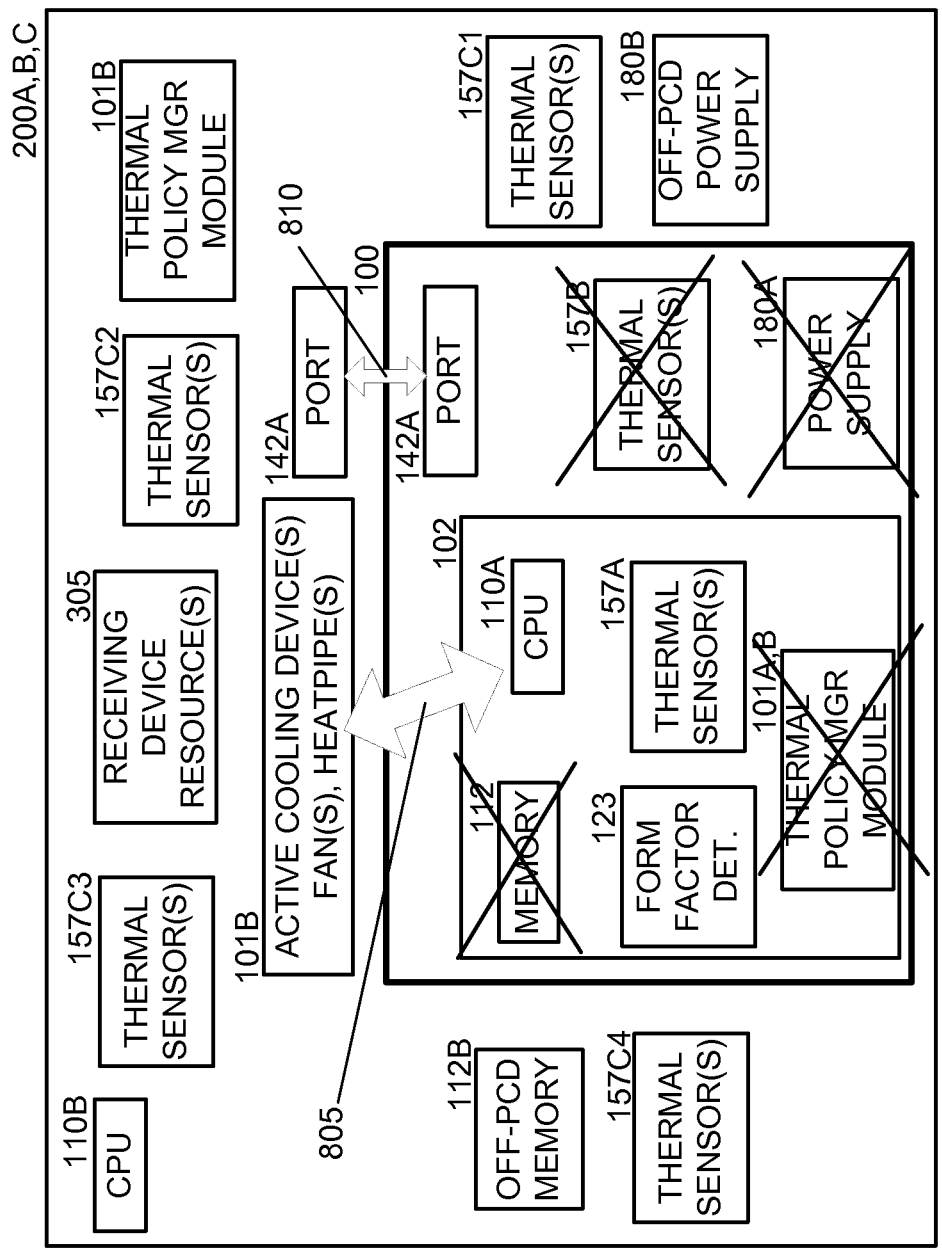
FIG. 8 is a functional block diagram illustrating an exemplary spatial arrangement of hardware for a receiving device and a portable computing device when the receiving device couples with the portable computing device.

FIG. 8 is a functional block diagram illustrating an exemplary spatial arrangement of hardware for a receiving device 200 and a portable computing device 100 when the receiving device 200 couples with the portable computing device 100. The receiving device 200 of this functional block diagram may correspond with the exemplary embodiments described above in connection with FIGS. 4-6.

When the receiving device 200 couples with the portable computing device 100, respective ports 142 of each device may align and mate with one another. As described previously, port 142A of the PCD 100 may comprise a USB port 142A which mates with a corresponding USB port 142B which is part of the receiving device 200. However, this disclosure is not limited to USB type ports 142, and other ports may be supported as understood by one of ordinary skill in the art. The PCD 100 in some exemplary embodiments may have a conventional USB port 142A and a second port that is designed for mating with the port 142B of the receiving device 200.

Power as well as data may flow between the ports 142 of the receiving device 200 and PCD 100. The port 142A of the PCD 100 may be coupled to the form factor detector 123 which is described above.

The form factor detector 123 may be coupled to the USB controller 140 (See FIG. 1). The form factor detector 123 may comprise hardware and/or software. The form factor detector may be responsible for detecting when the PCD 100 is coupled to the receiving device 200.

The form factor detector 123, according to one exemplary embodiment, may sense and/or read signals received from the USB port 142B originating from the receiving device 200. These signals may comprise an alphanumeric unique device identifier generated by the receiving device 200. If the unique identifier is sensed by the form factor detector 123, it may relay a message to the CPU 110A of the PCD 100 and/or the processor 126. In response to receiving this message, the CPU 110A of the PCD 100 and/or processor 126 may deactivate certain hardware and/or software within the PCD 100, such as the thermal policy manager module(s) 101A,B residing within the PCD 100 as well as certain thermal sensors 157, in addition to switching an operating system, as appropriate.

As a further response to receiving the message from the form factor detector 123, the CPU 110A and/or processor 126 of the PCD 100 may also establish communications with the thermal policy manager module(s) 101C of the receiving device 200 and relinquish control to the thermal policy manager module(s) 101C of the receiving device 200.

Specifically, the CPU 110A of the PCD 100 may deactivate its memory 112, its thermal policy manager modules 101A,B (See FIGS. 1-2), external thermal sensors 157B, and it's power supply 180. The CPU 110A may deactivate these elements in order to reduce and/or substantially eliminate any thermal energy produced by these elements while the PCD 100 is coupled to the receiving device 200. Each of these elements 112, 101A,B, 157B, and 180 have been illustrated with "X's" crossing through these elements to denote that these elements are now inactive or turned off.

Meanwhile, the CPU 110A and/or thermal policy manager module(s) 101C of the receiving device 200 may issue commands to keep internal thermal sensors 157A within the PCD 100 active or turned on. The thermal policy manager module 101C of the receiving device 200 may now increase the thermal limits for the CPU 110A of the PCD 100. According to one exemplary embodiment, the thermal policy manager module(s) 101C comprises hardware such as a chip or application-specific integrated circuit (ASIC).

With hardware, the thermal policy manager module(s) 101C may be able to make decisions more rapidly compared to any software counterparts or alternative designs. Typically, hardware for the thermal policy manager module(s) 101C may consume less power than software running on hardware. Which a hardware design, the thermal policy manager module(s) may react and log temperatures at a faster pace compared to any software counterpart approaches, i.e. faster temperature sampling rates usually may be achieved with hardware.

With respect to increasing the thermal limits for the CPU 110A of the PCD 100, the thermal policy manager module(s) 101C of the receiving device 200 may adjust the thermal policy to temperatures well above touch temperature limits. Exemplary touch temperature limits may generally range between about 40.0° C. to about 50.0° C. More specifically, a touch temperature limit may be about 45° C. which is approximately 113.0° F.

Exemplary temperature ranges that may be set by the thermal policy manager module(s) 101C of the receiving device 200 which are beyond touch temperature limits include, but are not limited to, between about 90.0° C. to about 125.0° C. More particularly, a higher temperature limit for the CPU 110A of the PCD 100 and its corresponding die 102 may be set by the thermal policy manager module(s) 101C of the receiving device 200 for approximately 115.0° C.

The thermal limits of the PCD 100 may be monitored by the thermal policy manager module(s) 101C of the receiving device 200 in which the module(s) 101C monitor the internal thermal sensors 157A which are proximate to the CPU 110A of the PCD 100 and any other active components of the PCD 100 which will remain active for supporting operations of the receiving device 200. In addition to the internal thermal sensors 157A within the PCD 100 being monitored by the module(s) 101C of the receiving device 200, the module(s) 101C may also monitor thermal sensors 157C residing within the receiving device 200.

For example, a first thermal sensor 157C1 within the receiving device 200 that is positioned adjacent to an OFF-PCD power supply 180B may be monitored with the thermal policy manager module(s) 101C. The OFF-PCD power supply 180B may comprise a rechargeable battery as well as a transformer as understood by one of ordinary skill in the art. The OFF-PCD power supply 180B may supply power to the power supply 180A contained within the PCD 100.

Similar to the first thermal sensor 157C1, the thermal policy manager module(s) 101C may also monitor a second thermal sensor 157C2 within the receiving device 200 positioned adjacent to a receiving device resource 305. A receiving device resource 305 may comprise any type of hardware and/or software such as, but not limited to, a display device, a controller for display device, additional memory, removable memory such as a flash memory drive and/or a CD-ROM drive, and the like.

A third thermal sensor 157C3 within the receiving device 200 may be monitored with the module(s) 101C and positioned adjacent to a CPU 110B that is within the receiving device 200. A fourth thermal sensor 157C4 within the receiving device 200 may be monitored by the thermal policy manager module(s) 101C. This fourth thermal sensor 157C4 may be positioned adjacent to OFF-PCD memory 112B which is located within the receiving device 200.

Therefore, the thermal policy manager module(s) 101C may monitor both thermal sensors 157A contained within the PCD 100 and those sensors 157C contained within the receiving device 200 itself. The thermal sensors 157C within the receiving device 200 may comprise any one of the types described above in connection with FIG. 1 and which are present within the PCD 100, such as, but not limited to, PTAT temperature sensors and/or thermistors.

In addition to monitoring both sets of thermal sensors 157, the thermal policy manager module(s) 101C may also control one or more active cooling devices 131. An active cooling device 131 may comprise a fan and/or a heat pipe. As understood by one of ordinary skill in the art, a heat pipe may comprise a hollow member that contains a fluid which may undergo a phase change in response to receiving any heat from a device, such as the PCD 100. The fluid within the heat pipe may evaporate in response to receiving thermal energy from the PCD 100 and the evaporated fluid may be moved to another area within the receiving device 200 by capillary action in which the absorbed energy may be discharged.

The cooling devices 131 may also comprise passive elements/devices. A passive cooling device 131 may comprise a heat sink, such as fins and/or air vents. The cooling devices 131 may include passive types or active types or both types.

When the PCD 100 is coupled to the receiving device 200, a mechanical coupling as indicated by arrow 805 may occur between any active and/or passive cooling device(s) 131 of the receiving device and the PCD 100. The mechanical coupling 805 may provide for a direct and physical contact between the PCD 100 and cooling device(s) 131. For an active cooling device 131, such as a heat pipe, the active cooling device 131 may physically contact an outer casing of the PCD 100 and in a specific region that is proximate to the dominant thermal producing devices of the PCD 100, such as the CPU 110A.

In addition to the cooling device(s) 131, the receiving device 200 may also employ different types of materials for maximizing heat transfer from the PCD 100 to the receiving device 200. For example, an outer surface or skin of the receiving device 200 may be designed for maximizing thermal conduction relative to the heat generated by the hardware and/or software of the PCD 100. According to some exemplary embodiments, the outer surface or skin of the receiving device 200 may comprise materials like metal and/or ceramics that are designed to conduct heat.

The OFF-PCD memory 112B may support functions and operations of the CPU 110A contained within the portable computing device 100. The OFF-PCD memory 112B may also support functions and operations of the CPU 110B that resides within the receiving device 200. The two CPUs 110A, 110B of the PCD 100 and the receiving device 200, respectively, may share tasks which support various receiving device resources 305 such as a display device as well as application software running within the OFF-PCD memory 112B.

The OFF-PCD memory 112B may comprise any type and size of memory as understood by one of ordinary skill the art. That is, the OFF-PCD memory 112B may comprise volatile and nonvolatile memory as understood by one of ordinary skill in the art. More specific examples (a non-exhaustive list) of the OFF-PCD memory 112B may include, but is not limited to: a portable computer diskette (magnetic), a random-access memory (RAM) (electronic), a read-only memory (ROM) (electronic), an erasable programmable read-only memory (EPROM, EEPROM, or Flash memory) (electronic), and the like.

Figure 9:
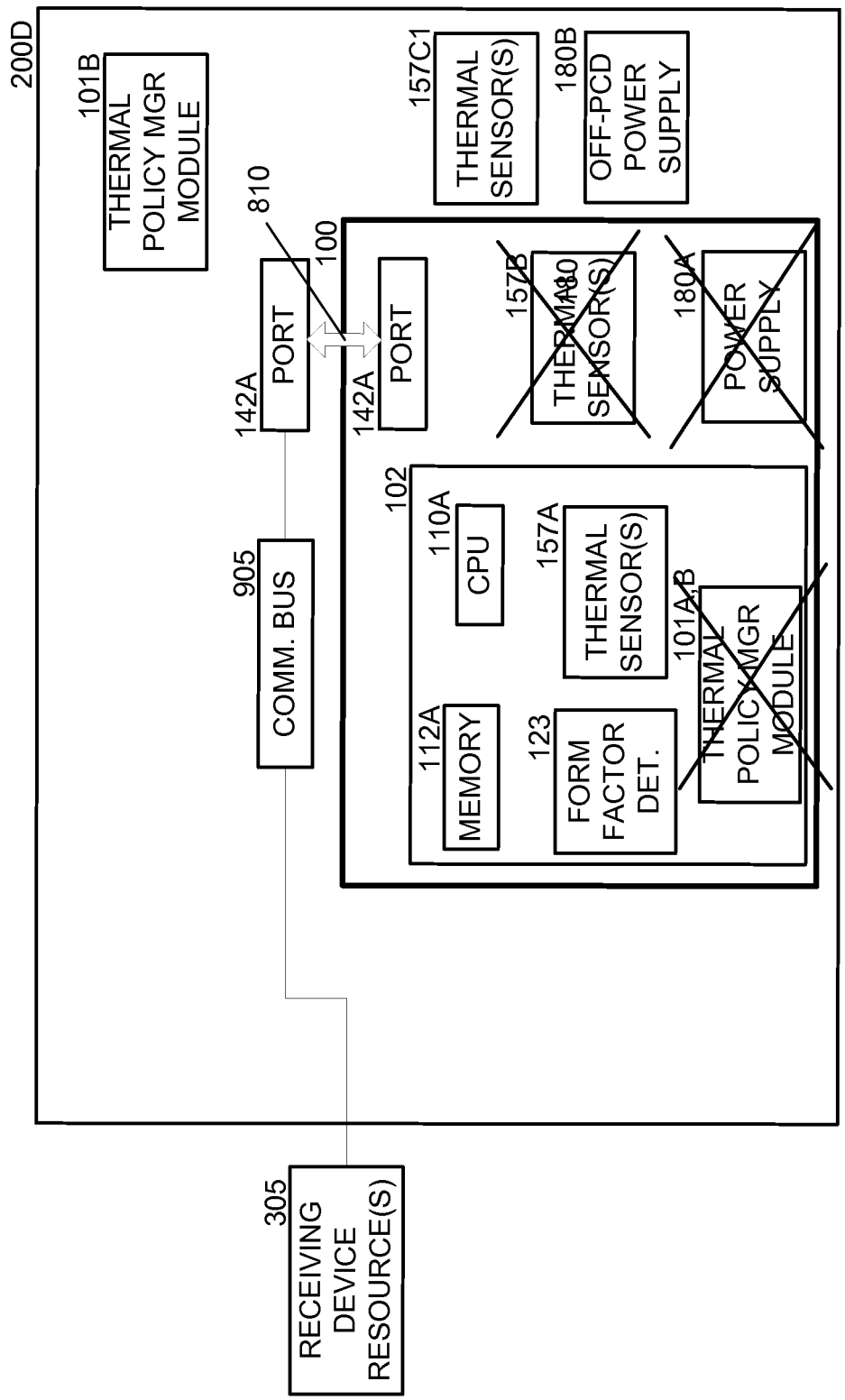
FIG. 9 is a functional block diagram illustrating another exemplary spatial arrangement of hardware for a receiving device and a portable computing device when the receiving device couples with the portable computing device.

FIG. 9 is a functional block diagram illustrating another exemplary spatial arrangement of hardware for a receiving device 200D and a portable computing device 100 when the receiving 200D device couples with the portable computing device 100. The receiving device 200D of this functional block diagram may correspond with the exemplary embodiment described above in connection with FIG. 7 in which the receiving device 200D comprises a docking station.

This functional block diagram of the receiving device 200D is similar to the functional block diagram of the receiving devices 200A-C illustrated in FIG. 8 described above. Therefore, only the differences between these figures will be described below.

According to this exemplary embodiment, the receiving device 200D may not include any memory 112, cooling devices 131, or receiving device resources 305 within the housing or casing of the receiving device 200D. The receiving device 200D of this exemplary embodiment may include a communication bus 905 that may coupled the PCD 100 with one or more different receiving device resources 305 which are not contained within the housing or casing of the receiving device 200D. In other words, these receiving device resources 305 of FIG. 9 may correspond with the display device 305A and the keyboard 305B illustrated in FIG. 7 which are outside of the housing of the receiving device 200.

Similar to the exemplary embodiment illustrated in FIG. 8, the memory 112A; the thermal policy manager module(s) 101A,B; external thermal sensors 157B; and power supply 180A within the PCD 100 may be deactivated or turned off when the PCD 100 is coupled to the receiving device 200D. In this way, the thermal policy of the PCD 100 when it is operating in this support mode for the receiving device 200 may be enhanced compared to a thermal policy in which touch temperature limits dictate operation of the PCD 100.

As understood by one of ordinary skill in the art, different thermal policies may exist for each different receiving device 200. In other words, each receiving device 200 may have its own independent and distinct thermal policy relative to another different receiving device 200. For example, a tablet portable computer receiving device 200A such as illustrated in FIG. 4 may have its own thermal policy manager module(s) 101C having a first policy while a docking station receiving device 200D such as illustrated in FIG. 7 may have its own thermal policy manager module(s) 101C having a second policy which is different from the first policy.

FIG. 10 is a logical flowchart illustrating method 1000 for managing a thermal policy of a receiving device 200 that couples to a portable computing device. The method 1000 generally corresponds to the exemplary embodiment illustrated in FIG. 8. Some aspects of the method 1000 may also correspond to the exemplary embodiment illustrated in FIG. 9.

Block 1005 is the first step of method 1000. In block 1005, the CPU 110A and/or the thermal policy manager module(s) 101A, B within the PCD 100 may monitor the form factor detector 123 for any signals. Next, in decision block 1010, the form factor detector 123 may determine if a receiving device 200 has been detected. Block 1010 generally corresponds to the form factor detector 123 sensing signals comprising a unique identifier corresponding and generated by a receiving device 200.

If the inquiry to decision block 1010 is negative, then the "NO" branch is followed back to block 1005. The inquiry to decision block 1010 is positive, then the "YES" branch is followed to block 1015.

In block 1015, the CPU 110A of the PCD 100 and/or the thermal policy manager module(s) 101C of the receiving device 200 may deactivate nonessential thermal sensors 157 within the PCD 100. Usually, these nonessential thermal sensors 157 within the PCD 100 will be those sensors 157 which are positioned adjacent to deactivated or hardware which has been turned off by the manager module(s) 101C. For example, external thermal sensors 157B off-chip 102 relative to the CPU 110A may be deactivated or turned off as illustrated in FIG. 8.

Next, in block 1020, the CPU 110A of the PCD 100 and/or the thermal policy manager module(s) 101C of the receiving device 200 may deactivate the thermal policy manager module(s) 101A,B of the PCD 100. In block 1025, the CPU 110A of the PCD 100 and/or the thermal policy manager module(s) 101C may deactivate the power supply 180A of the PCD 100. In block 1025, the CPU 110A of the PCD 100 and/or the thermal policy manager module(s) 101C may deactivate the memory 112A of the PCD 100.

One of ordinary skill in the art recognizes that blocks 1015-1030 may occur in parallel and/or in a different sequence without departing from the scope of this disclosure. Subsequently, in block 1035, the thermal policy manager module(s) 101C may be coupled to the CPU 110A as well as any other processors within the PCD 100 in addition to essential thermal sensors 157 contained within the PCD 100.

Next, in block 1040, the processors 110A, 126 within the PCD 100 may be coupled to the cooling devices 131 (if any exist) of the receiving device 200. As described above in connection with FIG. 8, such active cooling devices 131 may include, but are not limited to, fans as well as heat pipes and/or heat sinks/fins.

Subsequently, in block 1045, the PCD 100 may be coupled to the power supply 180B of the receiving device 200 (if any exists). As noted previously, the power supply 180B of the receiving device 200 may supply power to the PCD 100 in order to reduce the thermal activity of the PCD 100 so that the PCD 100 may maximize its operation within its thermal envelope. Power from the power supply 180B may flow through the port 142B of the receiving device 200 through the port 142A of the PCD 100. According to one exemplary embodiment, these ports 142 may comprise USB type ports as understood by one of orders skill the art.

Next, in block 1050, the processors 110A, 126 may be coupled to one or more receiving device resources 305 of the receiving device 200 as well as the OFF-PCD memory 112B contained within the receiving device 200. As noted previously, exemplary receiving device resources 305 may include, but are not limited to, display devices, memory devices, and input devices such as a keyboard or trackball/mouse.

Subsequently, in block 1055, the thermal policy manager module(s) 101C of the receiving device 200 may monitor the thermal sensors 157C of the receiving device 200 in addition to the essential thermal sensors 157A which remain active within the PCD 100. In block 1060, the thermal policy manager module(s) 101C of the receiving device 200 may adjust operation of the processors 110A, 126 within the PCD 100 and the active cooling device(s) 131 if certain temperature thresholds are detected with the essential thermal sensors 157A within the PCD 100. Specifically, the thermal policy manager module(s) 101C may increase or decrease activity of a fan and/or heat pipes which may be coupled to regions or areas corresponding to hotspots within the PCD 100.

In block 1065, the thermal policy manager module(s) 101C of the receiving device 200 may adjust operation of the processor(s) 110B of the receiving device 200 and the one or more active cooling devices 131 if temperature thresholds are detected with the thermal sensors 157C within the receiving device 200.

In decision block 1070, the form factor detector 123 may determine if the PCD 100 has been removed from the receiving device 200. If the inquiry to decision block 1070 is negative, then the "NO" branch is followed back to block 1055 in which the thermal policy manager module(s) 101C of the receiving device may continue monitoring of the thermal sensors 157A.

If the inquiry to decision block 1070 is positive, then the "YES" branch is followed to block 1075. In block 1075, the thermal policy manager module(s) 101A, B is activated along with the power supply 180A, memory 112A, and all thermal sensors 157 for stand-alone operation of the PCD 100. The method 1000 may then return back to block 1005.

In view of the inventive system and methods described above, an Original Equipment Manufacturer ("OEM") may program the thermal policy manager module(s) 101A-C to have a set of thermal states that may comprise different conditions for initiating one or more thermal mitigation techniques for reducing heat produced by the portable computing device 100. An OEM may select a set of thermal mitigation techniques corresponding to each thermal state for the thermal policy manager module(s) 101A-C.

Each set of thermal mitigation techniques may be unique for a particular thermal state. The thermal policy manager module(s) 101A-C may be programmed by the OEM to have thresholds for each thermal mitigation technique in which temperature thresholds are used. Each thermal mitigation technique may comprise a unique power reducing algorithm relative to other existing thermal mitigation techniques.

An OEM may program the thermal policy manager module(s) 101A-C to have one or more magnitudes for power reductions that are associated with a particular thermal mitigation technique. In other embodiments, an OEM may program the thermal policy manager module(s) 101A-C to have a plurality of thermal mitigation techniques that sacrifice quality of service of the portable computing device in a series of graduated steps for reducing heat produced by the portable computing device.

An OEM may program the thermal policy manager module(s) 101A-C to activate thermal mitigation techniques in a sequence based on the functions produced by application programs being executed by the portable computing device 100. For example, each algorithm may be activated based on a specific function or task being executed by an application program running on the portable computing device 100.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium.

In the context of this document, a computer-readable medium is an electronic, magnetic, optical, or other physical device or means that may contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" may include any means that may store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

Computer-readable media include both computer storage media and communication media including any medium that facilitates transfer of a computer program from one place to another. A storage media may be any available media that may be accessed by a computer. By way of example, and not limitation, such computer-readable media may comprise any optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for managing a thermal policy of a receiving device that couples to a portable computing device, the method comprising:
   detecting a presence of the portable computing device with the receiving device; and
   in response to detecting the presence of the portable computing device:
   issuing a command to deactivate a thermal sensor within the portable computing device;
   issuing a command to deactivate a power supply within the portable computing device;
   receiving a signal comprising a temperature value; and
   issuing a command to adjust an operating condition of a processor within the portable computing device if the temperature value reaches a predetermined value.

2. The method of claim 1, further comprising issuing a command to deactivate a thermal policy manager module.

3. The method of claim 1, further comprising issuing a command to deactivate a memory device.

4. The method of claim 1, further comprising issuing a command to initialize a memory device within the receiving device for receiving data.

5. The method of claim 1, further comprises issuing a unique identifier in response to detecting the portable computing device.

6. The method of claim 5, further comprising communicating the unique identifier across a port.

7. The method of claim 6, wherein the port comprises a universal serial bus (USB) port.

8. The method of claim 1, further comprising initializing an active cooling device.

9. The method of claim 8, further comprising adjusting operation of the active cooling device if the temperature value reaches a predetermined value.

10. The method of claim 1, wherein the receiving device comprises at least one of a docking station, a tablet personal computer, a laptop personal computer, a desktop personal computer, a portable media player, a portable television, and a printer.

11. A computer system for managing a thermal policy of a receiving device that couples to a portable computing device, the system comprising:
   a processor operable for:
      detecting a presence of the portable computing device with the receiving device; and
      in response to detecting the presence of the portable computing device:
      issuing a command to deactivate a thermal sensor within the portable computing device;
      issuing a command to deactivate a power supply within the portable computing device;
      receiving a signal comprising a temperature value; and issuing a command to adjust an operating condition of a processor within the portable computing device if the temperature value reaches a predetermined value.

12. The system of claim 11, wherein the processor is further operable for issuing a command to deactivate a thermal policy manager module.

13. The system of claim 12, wherein the processor is further operable for issuing a command to deactivate a memory device.

14. The system of claim 11, wherein the processor is further operable for issuing a command to initialize a memory device within the receiving device for receiving data.

15. The system of claim 11, wherein the processor is further operable for issuing a unique identifier in response to detecting the portable computing device.

16. The system of claim 15, wherein the processor is further operable for communicating the unique identifier across a port.

17. The system of claim 16, wherein the port comprises a universal serial bus (USB) port.

18. The system of claim 11, wherein the processor is further operable for initializing an active cooling device.

19. The system of claim 18, wherein the processor is further operable for adjusting operation of the active cooling device if the temperature value reaches a predetermined value.

20. The system of claim 11, wherein the receiving device comprises at least one of a docking station, a tablet personal computer, a laptop personal computer, a desktop personal computer, a portable media player, a portable television, and a printer.

21. A computer system for managing one or more memory resources of a wireless handheld computing device, the system comprising:
    means for detecting a presence of the portable computing device with the receiving device;
    means for issuing a command to deactivate a thermal sensor within the portable computing device in response to detecting the presence of the portable computing device;
    means for issuing a command to deactivate a power supply within the portable computing device in response to detecting the presence of the portable computing device;
    means for receiving a signal comprising a temperature value; and
    means for issuing a command to adjust an operating condition of a processor within the portable computing device if the temperature value reaches a predetermined value.

22. The system of claim 21, further comprising means for issuing a command to deactivate a thermal policy manager module.

23. The system of claim 21, further comprising means for issuing a command to deactivate a memory device.

24. The system of claim 21, further comprising means for issuing a command to initialize a memory device within the receiving device for receiving data.

25. The system of claim 21, further comprising means for issuing a unique identifier in response to detecting the portable computing device.

26. The system of claim 25, further comprising means for communicating the unique identifier across a port.

27. The system of claim 26, wherein the port comprises a universal serial bus (USB) port.

28. The system of claim 21, further comprising means for initializing an active cooling device.

29. The system of claim 28, further comprising means for adjusting operation of the active cooling device if the temperature value reaches a predetermined value.

30. The system of claim 21, wherein the docking station, a tablet personal computer, a laptop personal computer, a desktop personal computer, a portable media player, a portable television, and a printer.

31. A computer program product comprising a non-transitory computer readable medium having a computer readable program code embodied therein, said computer readable program code adapted to be executed to implement a method for managing a thermal policy of a receiving device that couples to a portable computing device, said method comprising:
    detecting a presence of the portable computing device with the receiving device; and
    in response to detecting the presence of the portable computing device:
    issuing a command to deactivate a thermal sensor within the portable computing device;
    issuing a command to deactivate a power supply within the portable computing device;
    receiving a signal comprising a temperature value; and
    issuing a command to adjust an operating condition of a processor within the portable computing device if the temperature value reaches a predetermined value.

32. The computer program product of claim 31, wherein the program code implementing the method further comprises:
    issuing a command to deactivate a thermal policy manager module.

33. The computer program product of claim 31, wherein the program code implementing the method further comprises:
    issuing a command to deactivate a memory device.

34. The computer program product of claim 31, wherein the program code implementing the method further comprises:
    issuing a command to initialize a memory device within the receiving device for receiving data.

35. The computer program product of claim 31, wherein the program code implementing the method further comprises:
    issuing a unique identifier in response to detecting the portable computing device.

36. The computer program product of claim 35, wherein the program code implementing the method further comprises:
    communicating the unique identifier across a port.

37. The computer program product of claim 36, wherein the port comprises a universal serial bus (USB) port.

38. The computer program product of claim 31, wherein the program code implementing the method further comprises:
    initializing an active cooling device.

39. The computer program product of claim 38, wherein the program code implementing the method further comprises:
    adjusting operation of the active cooling device if the temperature value reaches a predetermined value.

40. The computer program product of claim 31, wherein the receiving device comprises at least one of a docking station, a tablet personal computer, a laptop personal computer, a desktop personal computer, a portable media player, a portable television, and a printer.

* * * * *